US 6,672,462 B2

(12) United States Patent
Sharkey

(10) Patent No.: US 6,672,462 B2
(45) Date of Patent: Jan. 6, 2004

(54) METHOD AND APPARATUS FOR REMOVING PARTICULATE CONTAMINANTS FROM COMMERCIAL LAUNDRY WASTE WATER

(76) Inventor: James P. Sharkey, 1535 Middle Rd., Calverton, NY (US) 11933

( * ) Notice: Subject to any disclaimer, the term of this patent is extended or adjusted under 35 U.S.C. 154(b) by 308 days.

(21) Appl. No.: 09/837,766

(22) Filed: Apr. 18, 2001

(65) Prior Publication Data

US 2002/0153334 A1 Oct. 24, 2002

(51) Int. Cl.[7] .............................................. B01D 29/01
(52) U.S. Cl. .................... 210/409; 210/407; 210/433.1; 210/532.1; 210/533
(58) Field of Search ................................ 210/407, 409, 210/248, 348, 433.1, 459, 513, 532.1, 537, 533

(56) References Cited

U.S. PATENT DOCUMENTS

| 2,942,730 A | * | 6/1960 | Fontein | |
| 4,046,694 A | * | 9/1977 | Ellis | |
| 5,575,913 A | * | 11/1996 | Sharkey | 210/409 |
| 5,904,843 A | * | 5/1999 | Herbst | 210/170 |

* cited by examiner

Primary Examiner—Robert Popovics
(74) Attorney, Agent, or Firm—Galgano & Burke

(57) ABSTRACT

A filtration apparatus includes a filter element disposed at a 45 degree angle defining an upper chamber for solids and a lower chamber for liquid. A trough is disposed at the lower end of the filter element. The floor of the trough funnels toward a central drain and an overflow drain is located approximately 8 inches above the trough floor. The lower chamber is provided with a drain for recirculating water to a sprayer above the filter element and is also provided with an overflow drain approximately 8 inches above the floor.

6 Claims, 4 Drawing Sheets

METHOD AND APPARATUS FOR REMOVING PARTICULATE CONTAMINANTS FROM COMMERCIAL LAUNDRY WASTE WATER

This application is related to co-owned U.S. Pat. No. 5,575,913, the complete disclosure of which is hereby incorporated herein by reference.

BACKGROUND OF THE INVENTION

1. Field of the Invention

The present invention relates generally to a filtration apparatus for separating solid particles from a liquid. More particularly, the invention relates to filtration apparatus for removing particulate contaminants from commercial laundry waste water and to methods for accomplishing the same.

2. State of the Art

State and local governments across the country as well as the federal government have enacted new laws or expanded existing laws to reverse or limit the threat of environmental pollution. These environmental laws are typically directed toward commercial enterprises which create various wastes streams as a by-product of manufacturing products or providing services. The commercial laundry industry and particularly commercial laundromats are specifically affected by environmental laws which limit the amount of suspended solids or particulate contaminants in commercial laundry waste water which can be discharged into the environment. Particulate contaminants in commercial laundry waste water generally consist of lint, hair, dirt and soap scum. To meet the requirements of current environmental laws, the amount of particulate contaminants in commercial laundry waste water must be reduced to an acceptable level before it is discharged into the ground water and/or municipal sewage system.

Co-owned U.S. Pat. No. 5,350,526 discloses a filtration apparatus specifically intended for removing particulate contaminants from commercial laundry waste water. It has at least one porous mesh-like filter bag coupled between an inlet manifold for receiving waste water containing particulate contaminants and an outlet manifold for discharging the particulate contaminants separated from the waste water. The filter bag is agitated by a paddle, so as to prevent the mesh-like material of the filter bag from being clogged. The apparatus is capable of trapping particles as small as 5 microns depending on the filter bag mesh. Those skilled in the art will appreciate that the finer the mesh the more slowly the water will be filtered. One of the challenges in designing a filter for commercial laundry waste water is to be able to accommodate a flow rate of about 12,500 gallons per day.

Co-owned U.S. Pat. No. 5,575,913 discloses a filtration apparatus having a housing, a filter element, an inlet, a first discharge outlet and a second discharge outlet. The housing includes a bottom and an upwardly extending surrounding wall. The filter element is disposed in the housing and spans the surrounding wall with the filter element spaced above the bottom of the housing to define an upper chamber and a lower chamber, and the filter element being angled, preferably 45 degrees from the horizontal, so that one end of the filter element is lower relative to the other end. The inlet is in fluid communication with the upper chamber for receiving waste water containing particulate contaminants. A first discharge outlet is in fluid communication with the lower chamber for discharging filtered waste water. The second discharge outlet is in fluid communication with the upper chamber adjacent the lower end of the filter element for discharging filtered particulate contaminants. Particulate contaminants are removed from the filter element by a water spray. The apparatus is capable of trapping particles about 50 microns in diameter.

The apparatus disclosed in the '913 patent, while a vast improvement over the prior art, can still be improved. Challenges still remain regarding the build up of solids on the filter element; the removal of lint, hair, and other similar solids from water; water overflow through the filter element; hardening of dried solids within the apparatus; the failure of solids to be drained from the apparatus; and the need for regular human intervention.

SUMMARY OF THE INVENTION

It is an object of the invention to provide an improved filtration apparatus and method for separating and removing particulate contaminants from a relatively large continuous flow of laundry waste water for discharge of the filtered waste water into the environment, i.e., ground water and/or municipal sewage system.

It is another object of the invention to provide such a filtration apparatus having a filter element for separating particulate contaminants from laundry waste water in which the separated particulate contaminants can be easily and quickly manually or automatically removed from the apparatus without injuring or removing the filter element.

It is still another object of the invention to provide such a filtration apparatus wherein hair, lint, sand and other collected solids are quickly and efficiently discharged without manual intervention.

It is yet another object of the invention to provide such a filtration device wherein collected solids are kept in a fluid suspension for easy fluid discharge.

It is also an object of the invention to provide such a filtration device wherein water overflow through the filter element is prevented.

It is another object of the invention to provide such a filtration device wherein water used to spray the filter element is conserved.

It is still yet another object of the present invention to provide such a filtration apparatus that is easily and inexpensively manufactured; highly efficient in operation, and which requires little lifetime maintenance.

In accord with these objects which will be discussed in detail below, the filtration apparatus of the present invention includes a housing, a filter element, an inlet, a first discharge outlet and a second discharge outlet. The housing includes a bottom and an upwardly extending surrounding wall. The filter element is disposed in the housing and spans the surrounding wall with the filter element spaced above the bottom of the housing to define an upper chamber and a lower chamber, and the filter element being angled, preferably 45 degrees from the horizontal, so that one end of the filter element is lower relative to the other end. A wall is located at the lower end of the filter element to provide a trough adjacent to the lower chamber to collect water with suspended particles. The inlet is in fluid communication with the upper chamber for receiving waste water containing particulate contaminants. The first discharge outlet is in fluid communication with the lower chamber for discharging filtered waste water. The second discharge outlet is in fluid communication with the trough for discharging filtered particulate contaminants suspended in water. Particulate contaminants are removed from the filter element and drained into the trough by a water spray located above the filter element.

According to the preferred embodiment, the trough discharge outlet is located in the middle of the bottom of the trough and the bottom of the trough is tapered downward to the discharge outlet. An overflow discharge is also located in the trough to prevent water from overflowing above the filter element and floating solids back onto the filter element. The overflow discharge is preferably terminated with a T-fitting so that water is drained from below the surface. The lower chamber is also provided with a second discharge for recycling filtered water to the spraying system.

The filtration unit according to the invention has the capacity to filter larger volume of water more efficiently, and requires little or NO human physical participation. The addition of the trough creates a filter system with its own solid waste storage capabilities. This creates longer filter runs without the need for manual or electrically timed discharge, this means less energy used and less manual attention to the unit.

The filter screen is never compromised with the collected solids on the mesh screen itself Thus the filter screen is always free from solids. This allows the filter the ability to handle a continuous higher volume and will always remain at its maximum use and potential.

The unit will also supply itself with its own feed water for the action of spraying down the screen.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
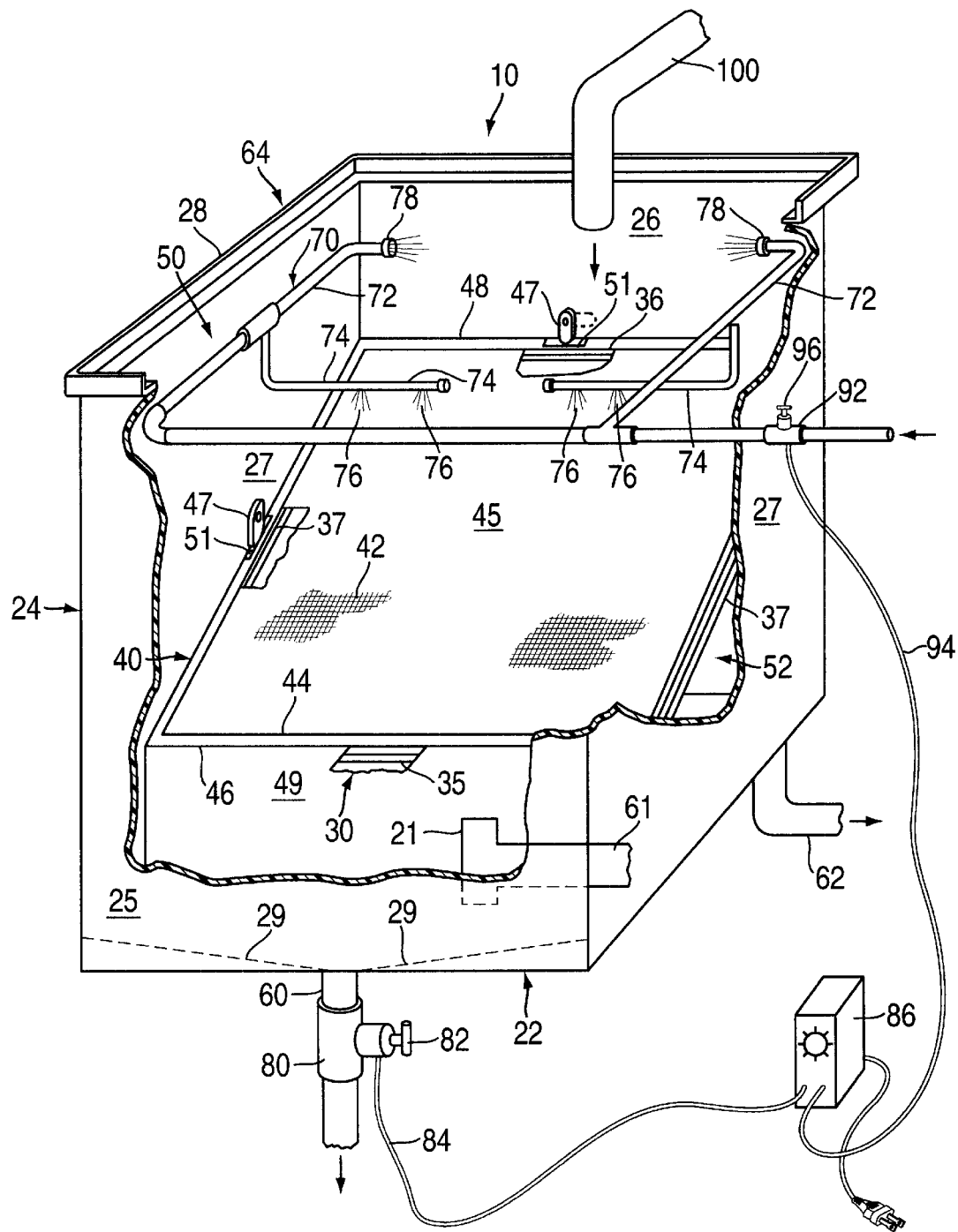
FIG. 1 is a fragmentarily-illustrated perspective view of the filtration apparatus embodying the present invention with portions broken away to show internal construction.

Turning now to the drawings, and in particular to FIG. 1, a filtration apparatus 10 according to the invention receives laundry waste water discharge from a number of commercial laundry washing machines via pipe 100. The filtration apparatus 10 generally includes a housing 20, a filter element 40, a laundry waste water inlet having an open top end 64, a filtered waste water discharge outlet 62, particulate contaminate outlet 60 and a sprayer 70.

The housing 20 includes a bottom 22 and an upwardly extending surrounding wall 24. Specifically, housing 20 has a generally open box-like configuration in which bottom 22 is rectangularly shaped and upwardly extending side wall 24 consists of a front wall 25, a rear wall 26 and two side walls 27. It is appreciated that the bottom 22 of housing 20 can be circularly or squarely shaped. Preferably, housing 22 is fabricated from a rust resistant material such as a plastic material.

The filter element 40 is disposed in the interior of housing 20, spanning between the interior surface of surrounding wall 24. Generally, the filter element 40 consists of an interwoven filtering material 42, preferably a micro screen such as a monofilament mesh fabricated from nylon, and a surrounding frame 44. The frame 44 provides a border around interwoven filtering material 42 and which serves as structural support for interwoven filtering material 42. Such factors as the amount and consistency of the laundry waste water flow rate, and size and amount of solid particulate contaminants, etc. will dictate the desired mesh size of the interwoven filtering material 42. Desirably, the interwoven filtering material 42 has a mesh size ranging from about 70 microns to 25 microns. Preferably, the frame 44 is fabricated from a rust resistant metal such as aluminum.

The housing 20 includes a support 30 attached to the interior surface of surrounding wall 24 for providing support to filter element 40. Specifically, the support 30 includes a lower front support 35, an upper rear support 36, and two side supports 37 which are angled from lower front support 35 to the upper rear support 36. Preferably, the support 30 includes a continuous rubber material which forms a seal with frame 44 of the filter element 40 so that, as explained below, particulate contaminants will not pass around frame 44 but will be retained on interwoven filtering material 42.

Preferably, the housing 20 includes a plurality of releasable locking means 47 for releasably locking the frame 44 of the filter element 40 in a fixed position in the housing 20. The releasable locking means 47 may comprise pivotable latch-like arms mounted on each of the sidewalls 25, 26 and 27 for movement between a release position (shown in phantom in FIG. 1) and a locking position with respect to the frame 44. In the latter position, it either closely abuts the frame 44 or is received within a corresponding slot 51 in frame 44.

The filter element 40 is disposed within the interior of housing 20 and spaced apart from bottom 22 forming an upper chamber 50 (unfiltered space) and a lower chamber 52 (filtered space). The filter element 40 is angled so that a lower end 46 is lower relative to an upper end 48. Preferably, the filter element 40 is angled at between about 30 degrees and 60 degrees from the horizontal. Most preferably, filter element 40 is angled at about 45 degrees from the horizontal.

The upper edge 28 of the surrounding wall 24 forms waste water inlet 64, in fluid communication with upper chamber 50, for receiving laundry waste water containing particulate contaminants from discharge pipe 100. It will be appreciated that the housing 20 can include a cover or lid supported on upper edge 28 of surrounding wall 24 and provided with a inlet opening for receiving laundry waste water containing particulate contaminants.

A filtered waste water discharge outlet 62, in fluid communication with lower chamber 52, provides for discharge of collected filtered waste water in lower chamber 52. Filtered waste water discharge outlet 62 can be positioned over a floor drain or connected to a conduit for discharge of the collected filtered waste water into the ground water and/or municipal sewage system. According to one aspect of the invention, and as seen best in FIGS. 2 and 4, the filtered waste water discharge outlet 62 extends upward from the bottom 22 of housing 20 for about eight inches. This creates a reservoir of filtered water 113 inside the chamber 52. A drain 71 is located approximately one inch from the floor 22 of the chamber 52. The drain 71 provides access to the reservoir of filtered water which may be recycled to the sprayer 70 with the aid of a pump (not shown).

Figure 2:
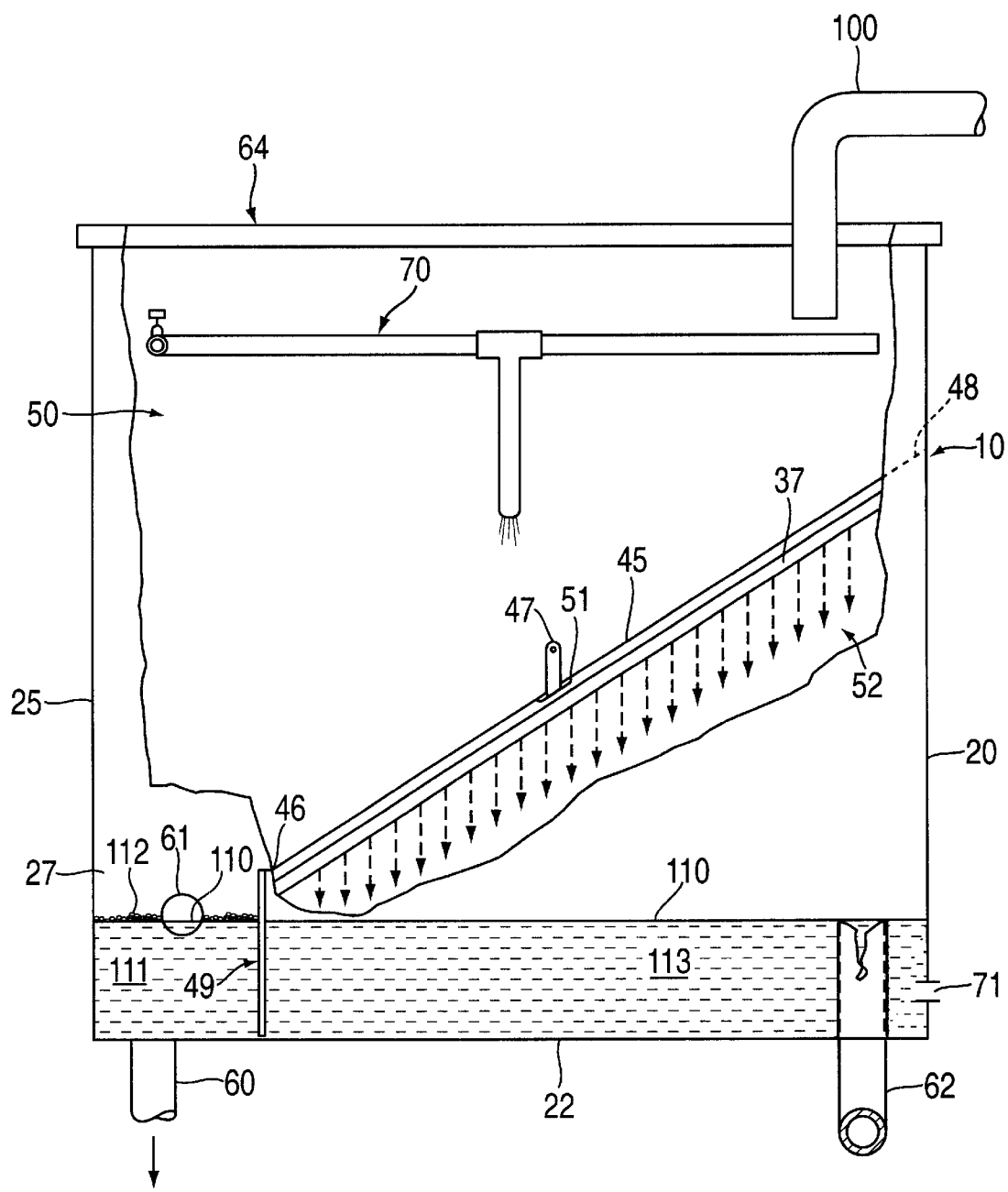
FIG. 2 is a fragmentarily-illustrated side view of the filtration apparatus shown in FIG. 1.
Figure 4:
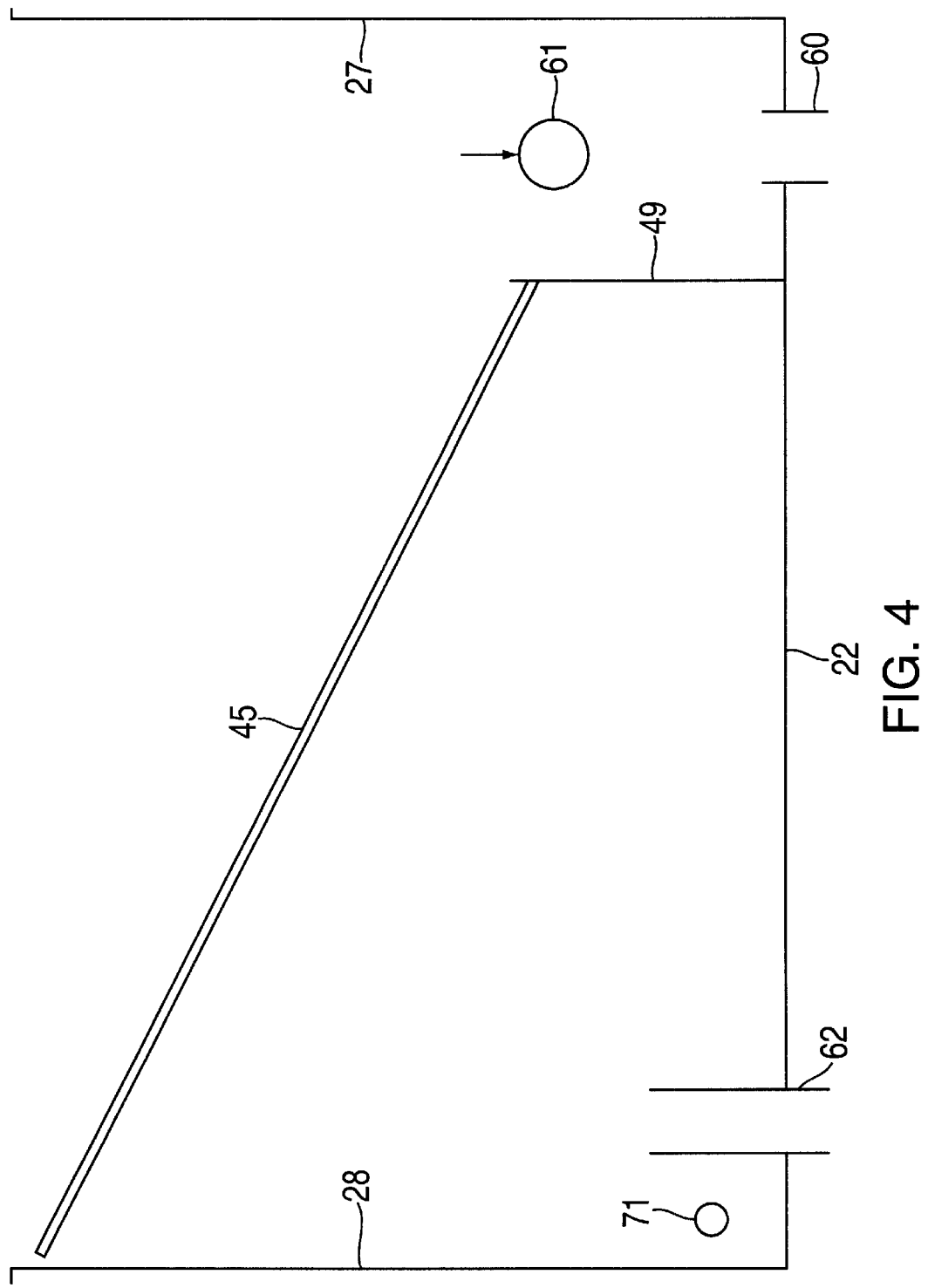
FIG. 4 is a schematic side elevation view of the relative locations of the four discharge outlets of the invention.

According to another aspect of the invention, a wall 49 seen best in FIGS. 2 and 4, is disposed parallel to the front wall 25 between the floor 22 and the bottom end 46 of the filter element to create a trough separated from the lower chamber 52. The particulate contaminate discharge outlet 60, in fluid communication with the trough of the upper chamber 50, is preferably centrally located. As seen best in FIG. 1, the floor 29 of the trough preferably funnels toward the centrally located discharge 60.

Figure 3:
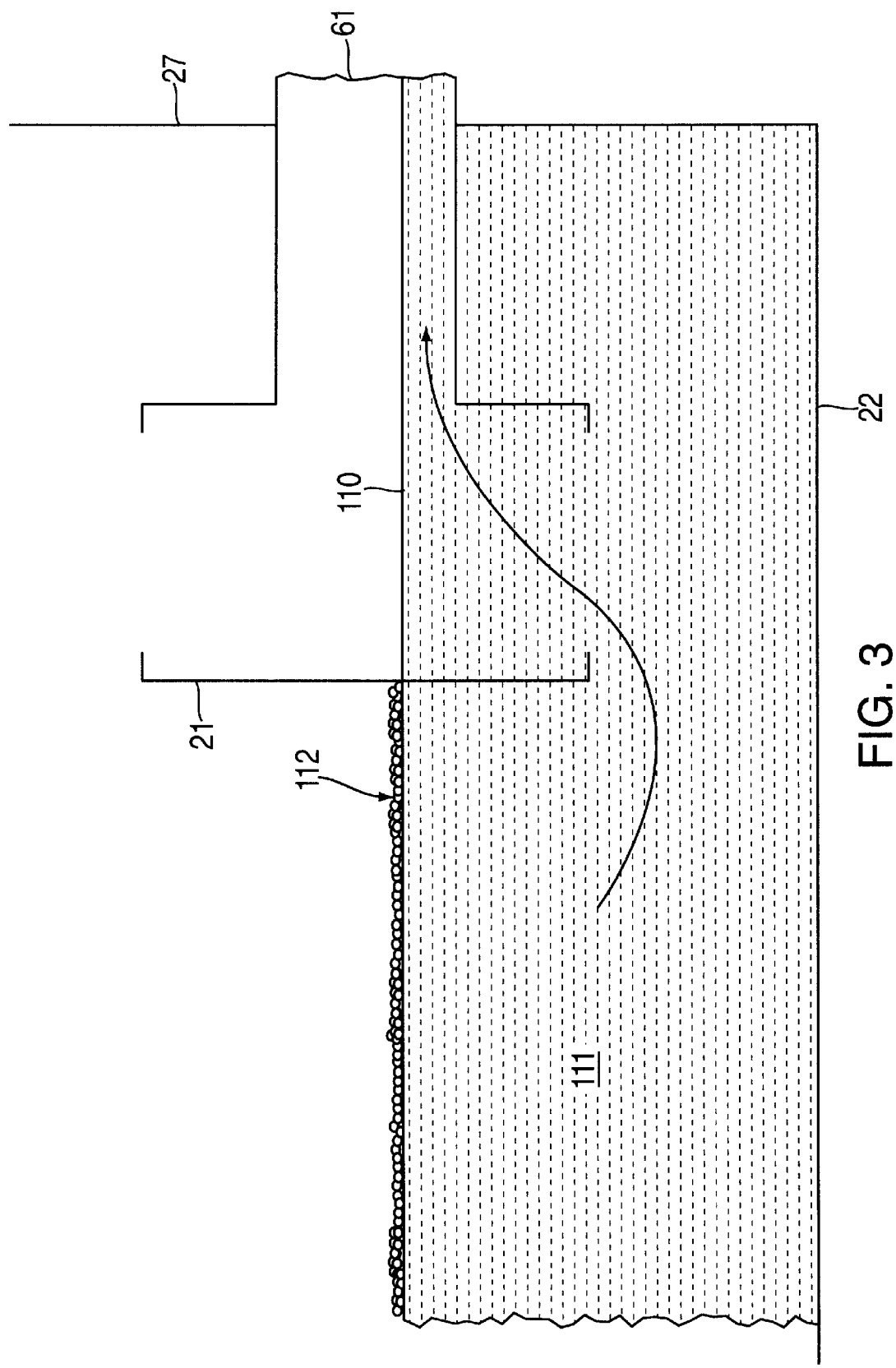
FIG. 3 is a schematic side elevation view of the overflow drain.

According to yet another aspect of the invention, a particulate contaminate discharge overflow outlet 61 is disposed in side wall 27 adjacent lower end 46 of filter element 40. As seen best in FIG. 3, the outlet 61 terminates in a T-fitting 21 so that liquid is discharged from below the surface 110 of the waste water 111 and the collected film of solid waste 112 (see arrow) and recycled back to the waste water inlet pipe 100 via a pump (not shown).

As seen in FIGS. 1 and 2, spray means 70 for discharging a spray of liquid, preferably water under pressure from a suitable source (not shown), across an upper surface 45 of filter element 40 flushes or causes particulate contaminants collected on upper surface 45 of filter element 40 to move toward lower end 46 into the trough and toward particulate contaminate discharge outlet 60. Specifically, the spray means 70 includes a pair of pipes 72 each extending horizontally along the interior of housing above filter element 40. Extending from each pipe 72 are L-shaped pipes 74 having a pair of nozzles 76. In addition, nozzles 78 are attached at each end of pipe 72. Preferably, pipes 72 and L-shaped pipes 74 are fabricated from a plastic material such as polyvinyl chloride (PVC). It will be appreciated that one skilled in the art could provide other equally suitable alternative configurations for positioning the spray nozzles above filter element 40 to cause accumulated particulate contaminants on upper surface 45 of filter element 40 to move toward lower end 46 and toward particulate contaminate discharge outlet 60.

Spray means 70, as explained below, can be operated to prohibit particulate contaminants from accumulating on upper surface 45 of filter element 40 and clogging the interwoven filtering material 42 of filter element 40 by either constantly supplying a spray of liquid during operation or alternatively at periodic intervals. Removal of particulate contaminants from filtering apparatus 10 can be accomplished manually or preferably by coordination of spray means 70 and a discharge valve 80. Specifically, discharge valve 80 is in fluid communication with particulate contaminate discharge outlet 60 and is normally closed so that laundry waste water is not carried out particulate contaminate discharge outlet 60 during operation. When the filter element 40 has and excessive amount of accumulated particulate contaminants thereon, the discharge valve 80 can be opened and the accumulated particulate contaminants can be flushed out by activation of spray means 70. Preferably, discharge valve 80 is operated by a conventional solenoid 82 connected by an electrical wire or lead 84 to a conventional timer 86 for automatic periodic flushing and discharge of the collected particulate contaminants in conjunction with spray means 70 by concurrent control of valve 92 operated by solenoid 96 also connected via wire 94 or the like to timer 86, the latter of which would be connected to an electrical outlet. As mentioned above, water for the sprayer 70 is preferably obtained from outlet 71 provided in the lower chamber 52.

The operation of the present invention will be understood as follows: laundry waste water from washing machines is introduced into the filtration apparatus 10 by laundry waste water discharge tube 100 as shown by the solid arrow in FIG. 1. The laundry waste water is deposited on upper end 48 of upper surface 45 of filter element 40. Filtered waste water, shown as dashed arrows in FIG. 2, passes through the filter element 40 while particulate contaminants accumulate on upper surface 45 of the filter element 40.

The unique design of filtering system 10 takes advantage of gravitational forces, and hydraulic forces from subsequent discharge of laundry waste water to naturally cause accumulated particulate contaminants on upper surface 45 of filter element 40 to move downward along upper surface 45 toward lower end 46 and into the trough defined by wall 49. In addition, spray means 70 can be operated continuously or periodically to aid in causing accumulated particulate contaminants on upper surface 45 of filter element 40 to move downward along the upper surface toward lower end 46 and into the trough.

Removal of particulate contaminants from upper chamber 52 of housing 20 may be accomplished manually or preferably by coordination of spray means 70 and discharge valve 80. Specifically, spray means 70 is operated to supply a spray of liquid continuously during operation or at periodic intervals in coordination with discharge valve 80. Discharge valve 80 is attached to particulate contaminate discharge outlet 60 and is normally closed (unless continuous spraying is used) so that waste water is not carried out particulate contaminate discharge outlet 60 during normal filtering operation. When the trough and filter element 40 fills up with excessive particulate contaminants, discharge valve 80 can be opened and the accumulated retained particulate contaminants can be flushed out. Preferably, as indicated above, water supply valve 92 and discharge valve 80 are operated by conventional solenoids 82, 96, respectively, connected by wires 84, 94, respectively, to a conventional timer 86 for concurrent operation and automatic periodic flushing and discharge of the collected particulate contaminants. As mentioned above, the overflow drain 61 recirculates partially filtered waste water to the inlet of the filtration apparatus.

Various modifications can be made as will be apparent to those skilled in the art. For example, while only one row of pipes 74 and nozzles 76 are shown, two or more may be provided to facilitate contaminant discharge and cleaning of the filter or screen 40. However, the various parts shown in the drawing are commercially available so that the unit can be made economically.

Furthermore, although only one unit is shown in the drawings, multiple units could be employed in series having differently- and decreasingly-sized screen mesh openings to achieved a tiered screening effect.

The improvements provided by the present invention can be summarized in part as follows: the location of the wall 49 to define the trough, the location of the drain 60 in the center of the trough, the funnelling of the floor 29 of the trough, the provision of the T-drain 21/61 in the trough, the location of the raised drain 62 in the chamber 52 to provide a reservoir of filtered water, and the location of the drain 71 for tapping the reservoir. It will be appreciated that many of these improvements may be used either alone or in combination with each other.

It will therefore be appreciated by those skilled in the art that yet other modifications could be made to the provided invention without deviating from its spirit and scope as so claimed.

What is claimed is:

1. A filtration apparatus for filtering waste water containing particulate contaminants, said apparatus comprising:
   a) a housing having a bottom and an upwardly extending surrounding wall, and an inlet for receiving waste water containing particulate contaminants;
   b) a substantially planar filter element having an interwoven filtering material, said filter element being disposed in said housing and at least partially spanning said surrounding wall, said filter element being spaced between said bottom and said inlet of said housing at an angle thereby defining an upper end and a lower end of said filter element;

c) a dividing wall extending from the lower end of said filter element to said bottom of said housing thereby defining an unfiltered water space and a filtered water space;

d) a first discharge outlet in fluid communication with said filtered water space for discharging filtered waste water;

e) a second discharge outlet in fluid communication with said unfiltered water space for discharging particulate contaminants; and f) an overflow outlet in said unfiltered water space having a T-fitting inlet.

2. An apparatus according to claim 1, wherein:

said second discharge outlet is centrally located in said unfiltered water space and said bottom of said housing funnels toward said second discharge outlet in said unfiltered water space.

3. An apparatus according to claim 1, wherein:

said first discharge outlet includes an upstanding pipe rising from said bottom of said housing in said filtered water space, thereby creating a reservoir for filtered water.

4. An apparatus according to claim 3, further comprising:

f) a reservoir access outlet in fluid communication with said reservoir of filtered water.

5. A filtration apparatus for filtering waste water containing particulate contaminants, said apparatus comprising:

a) a housing having a bottom and an upwardly extending surrounding wall, and an inlet for receiving waste water containing particulate contaminants;

b) a substantially planar filter element having an interwoven filtering material and an end, said filter element being disposed in said housing and at least partially spanning said surrounding wall, said filter element being spaced between said bottom and said inlet of said housing thereby defining an upper unfiltered water space and a lower filtered water space;

(c) a dividing wall extending from said end of said filter element to said bottom of said housing thereby defining an unfiltered water space and a filtered water space;

(d) a first discharge outlet in fluid communication with said lower filtered water space for discharging filtered waste water, wherein said first discharge outlet including an upstanding pipe rising from said bottom of said housing in said filtered water space, thereby creating a reservoir for filtered water;

(e) a second discharge outlet in fluid communication with said unfiltered water space for discharging particulate contaminants; and (f) an overflow outlet in said unfiltered water space having a T-fitting inlet.

6. An apparatus according to claim 5, further comprising:

(g) a reservoir access outlet in fluid communication with said reservoir of filtered water.

* * * * *